United States Patent
Brunswig et al.

(10) Patent No.: US 10,055,113 B2
(45) Date of Patent: *Aug. 21, 2018

(54) SYSTEM AND METHOD FOR MODIFYING USER INTERFACE ELEMENTS

(71) Applicant: SAP SE, Walldorf (DE)

(72) Inventors: Frank Brunswig, Heidelberg (DE); Frank Jentsch, Muehlhausen (DE); Bare Said, St. Leon-Rot (DE)

(73) Assignee: SAP SE, Walldorf (DE)

( * ) Notice: Subject to any disclaimer, the term of this patent is extended or adjusted under 35 U.S.C. 154(b) by 184 days.

This patent is subject to a terminal disclaimer.

(21) Appl. No.: 15/213,679

(22) Filed: Jul. 19, 2016

(65) Prior Publication Data
US 2016/0328137 A1 Nov. 10, 2016

Related U.S. Application Data

(63) Continuation of application No. 12/975,813, filed on Dec. 22, 2010, now Pat. No. 9,423,920.

(51) Int. Cl.
| | |
|---|---|
| *G06F 3/0484* | (2013.01) |
| *G06F 3/0481* | (2013.01) |
| *G06F 3/0482* | (2013.01) |
| *G06F 17/30* | (2006.01) |
| *G06Q 10/06* | (2012.01) |

(52) U.S. Cl.
CPC ........ *G06F 3/04847* (2013.01); *G06F 3/0481* (2013.01); *G06F 3/0482* (2013.01); *G06F 17/3056* (2013.01); *G06F 17/30377* (2013.01); *G06Q 10/067* (2013.01)

(58) Field of Classification Search
CPC ........ G06F 17/24; G06F 8/34; G06F 17/2705; G06F 8/20; G06F 8/30
See application file for complete search history.

(56) References Cited

U.S. PATENT DOCUMENTS

| | | | |
|---|---|---|---|
| 7,225,432 B2 | 5/2007 | Jentsch et al. | |
| 7,225,433 B2 | 5/2007 | Jentsch et al. | |
| 7,315,853 B2 | 1/2008 | Brunswig et al. | |
| 7,454,660 B1 | 11/2008 | Kolb et al. | |
| 7,480,920 B2 | 1/2009 | Brendle et al. | |
| 7,487,512 B2 | 2/2009 | Brunswig et al. | |

(Continued)

OTHER PUBLICATIONS

Introduction to the Visual Studio.Net IDS Apr. 7, 2003, 31 pages.

(Continued)

*Primary Examiner* — Andrea Long
(74) *Attorney, Agent, or Firm* — Fish & Richardson P.C.

(57) ABSTRACT

The present disclosure involves systems, products, and methods for modifying elements within a user interface (UI). One method includes operations for identifying an instance of a UI text element for modification within a UI associated with a software application, wherein the UI is displayed to at least one user; retrieving a set of metadata associated with the identified instance of the UI text element, where each instance of the UI text element is associated with the retrieved set of metadata; receiving at least one modification to the retrieved set of metadata associated with the identified instance of the UI text element; and persisting the modified set of metadata associated with the UI text element.

20 Claims, 7 Drawing Sheets

(56) References Cited

U.S. PATENT DOCUMENTS

| | | |
|---|---|---|
| 7,533,103 B2 | 5/2009 | Brendle et al. |
| 7,536,673 B2 | 5/2009 | Brendle et al. |
| 7,676,816 B2 | 3/2010 | Brunswig et al. |
| 7,685,114 B2 | 3/2010 | Brunswig et al. |
| 7,685,268 B2 | 3/2010 | Brunswig et al. |
| 7,685,568 B2 | 3/2010 | Brendle et al. |
| 7,698,174 B2 | 4/2010 | Brunswig et al. |
| 7,702,650 B2 | 4/2010 | Brunswig et al. |
| 7,725,907 B2 | 5/2010 | Bloching et al. |
| 7,730,412 B2 | 6/2010 | Said |
| 7,765,494 B2 | 7/2010 | Brunswig et al. |
| 7,769,821 B2 | 8/2010 | Brunswig et al. |
| 7,770,146 B2 | 8/2010 | Brunswig et al. |
| 7,774,463 B2 | 8/2010 | Bloching et al. |
| 7,778,965 B2 | 8/2010 | Bindewald et al. |
| 7,797,370 B2 | 9/2010 | Brunswig et al. |
| 7,801,996 B2 | 9/2010 | Brunswig et al. |
| 7,810,102 B2 | 10/2010 | Brendle et al. |
| 2003/0221165 A1 | 11/2003 | Young |
| 2004/0123278 A1 | 6/2004 | Nanja |
| 2004/0243931 A1 | 12/2004 | Stevens et al. |
| 2004/0249823 A1 | 12/2004 | Raghuvir |
| 2006/0117249 A1 | 6/2006 | Hu et al. |
| 2007/0006041 A1 | 1/2007 | Brunswig et al. |
| 2007/0061431 A1 | 3/2007 | Brunswig et al. |
| 2007/0073702 A1 | 3/2007 | Brunswig et al. |
| 2007/0100943 A1 | 5/2007 | Brunswig et al. |
| 2007/0124740 A1 | 5/2007 | Brunswig et al. |
| 2007/0143390 A1* | 6/2007 | Giambalvo ............... G06F 8/61 709/200 |
| 2007/0157167 A1 | 7/2007 | Brendle et al. |
| 2007/0226751 A1 | 9/2007 | Brendle et al. |
| 2007/0233728 A1 | 10/2007 | Puteick et al. |
| 2007/0259602 A1 | 11/2007 | Xu et al. |
| 2007/0271107 A1 | 11/2007 | Fiedler et al. |
| 2008/0005623 A1 | 1/2008 | Said |
| 2008/0010074 A1 | 1/2008 | Brunswig et al. |
| 2008/0120597 A1 | 5/2008 | Brunswig et al. |
| 2008/0147455 A1 | 6/2008 | Brunswig et al. |
| 2008/0148166 A1 | 6/2008 | Brunswig et al. |
| 2008/0244616 A1 | 10/2008 | Brunswig et al. |
| 2009/0019424 A1 | 1/2009 | Klein |
| 2009/0144721 A1 | 6/2009 | Wagner et al. |
| 2009/0150473 A1 | 6/2009 | Brunswig et al. |
| 2010/0162146 A1 | 6/2010 | Winkler et al. |

OTHER PUBLICATIONS

Rick Leinecker, Visual Studio 2010 All-in-One for Dummies, pp. 98-101.

* cited by examiner

| Personalize Customize Help | | |
|---|---|---|
| *UI Text GEN_BYD_009826* — 402 | | |

Name: Status    Namespace: http://abc.com/xVap/Common/ODT    Status: 1 - Active

[Close] [Edit] — 405                                                                                    [View All]

UI Texts

| | | System Administrative Data | |
|---|---|---|---|
| Short Text: | Status | Creation Date: | 30.06 14:24 UTC |
| Tooltip Text: | | Creation User Account: | BERTHOLD |
| Column Text: | Status | Last Changed Date: | 30.06 16:24 UTC |
| Help Text: | | Last Changed User Account: | BERTHOLD |

⎱— 415

Technical Details

Package:            AP_COMMON_UTC
Category:           1 - Field Label
Original Language:  EN - English
Lifecycle Status:   1 - Active
Current Language:   DE - Deutsch

425

Available Languages

| Language | Short Text | Tool Tip | Column Header | Help Text |
|---|---|---|---|---|
| DE - De | Status | | Status | |
| EN - En | Status | | Status | |
| FR - Fra | Statut | | Statut | |
| ZH - Chi | 狀態 | | 狀態 | |

| Development | [ UI Text GEN_BYD_0 ] × | Neuer Kundenauftrag | | |

Edit UI Text GEN_BYD_009826

Personalize  Customize  Help

Name: Status  Namespace: http://abc.com/xVap/Common/ODT  Status: 1 - Active

[Save and Close] [Save] [Close]

505 — General Data | Texts — 510

Identification
Label Type: 1 - Field Label

System
Package: AP_COMMON_UIC
Creation Date: 30.06  14:24  UTC
Creation User: BERTHOLD
Last Changed Date: 30.06  16:24  UTC
Last Changed User: BERTHOLD
Original Language: EN - English

Texts
Language: EN - English
Short Text: Status
Content:

Development | Edit UI Text GEN_BY × | Neuer Kundenauftrag

500a

500b

Edit UI Text GEN_BYD_009826

Personalize  Customize  Help

Name: Status  Namespace: http://abc.com/xVap/Common/ODT  Status: 1 - Active

[Save and Close] [Save] [Close]

505 — General Data | Texts — 510

520  525

| Language ▲ | Short Text | Column Header | Tool Tip Text | Help Text |
|---|---|---|---|---|
| ZH - Chinese | 狀態 | 狀態 | | |
| DE - Deutsch | Status | Status | | |
| EN - English | Status | Status | | |
| FR - Français | Statut | Statut | | |

Development | Edit UI Text GEN_BY × | Neuer Kundenauftrag

SYSTEM AND METHOD FOR MODIFYING USER INTERFACE ELEMENTS

CLAIM OF PRIORITY

This application claims priority under 35 USC § 120 to U.S. patent application Ser. No. 12/975,813, filed on Dec. 22, 2010, the entire contents of which are hereby incorporated by reference.

TECHNICAL FIELD

The present disclosure relates to software, computer systems, and computer implemented methods for modifying elements within a user interface.

BACKGROUND

User interfaces (UIs) can provide users or clients of a computer or software system with the ability to provide input to the system, thus allowing users to manipulate the system. UIs can also provide users or clients with information defining or associated with the output of the computer or software system, sometimes in response to input provided by the users within the same or a related UI. Typically, UIs consist of elements including entry fields, push buttons, tables, tabs, and other UI components. The layout of the elements within a particular UI, their operations and associated backend operations, and their connections to one or more other elements within the UI may be defined by metadata, models, and other information. The metadata, models, and other information associated with the UI and its UI components can be used by an application or web page to render and generate the UI appropriately, as well as to receive and output data and other information, as appropriate, for the actions occurring within or associated with the UI.

SUMMARY

The present disclosure involves systems, products, and methods for modifying elements within a user interface (UI). One method includes operations for identifying an instance of a UI text element for modification within a UI associated with a software application, wherein the UI is displayed to at least one user; retrieving a set of metadata associated with the identified instance of the UI text element, where each instance of the UI text element is associated with the retrieved set of metadata; receiving at least one modification to the retrieved set of metadata associated with the identified instance of the UI text element; and persisting the modified set of metadata associated with the UI text element.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 3A and 3B are illustrations of two example implementations of related UIs rendered in German (FIG. 3A) and English (FIG. 3B), capable of being modified by a client in an example environment, such as that illustrated in FIG. 1.

FIG. 4 is an illustration of the navigation from an example application UI (as illustrated in FIG. 3A) to a UI Text Factsheet providing additional information on a particular UI element identified for modification within the example application UI.

FIG. 5 is an illustration of the navigation from the UI Text Factsheet (as illustrated in FIG. 4) to a UI Text Object Instance wherein a user or client can modify the particular UI element identified for modification.

DETAILED DESCRIPTION

This disclosure generally describes software, computer-implemented methods, and systems related to the modification of user interface (UI) elements presented to a user or client by a software application. UIs may include various UI elements, including text boxes, dropdown boxes, tables, and text fields, some or all of which include a label or other identifier to provide understanding to users working the UI and its associated application. In some instances, one or more of those UI elements may be incorrect, such as a particular UI element's label or identifier. Generally, modification to a UI may require a helpdesk ticket to be submitted, a notification sent to an entity or person managing a particular UI and/or application, or another method of notifying the appropriate persons about the error within the UI. The present application describes systems and methods for a straight-forward process that allows any user having the appropriate credentials, including a support employee, a software developer, a translator, a customer, or other end user, to correct errors and modify UIs immediately.

The present disclosure can be used as a benefit in many situations. In a first instance, a particular UI may simply have an error in a UI element's label due to an error during data entry or other incorrect backend data. In another instance, a UI may be used in a multi-national business or in a set of multi-language UIs, where certain UI elements may be associated and presented with different and language-dependent texts within the UI (e.g., field labels, titles, identifiers, etc.). In still another instance, context-related errors may be included with particular UI elements, such as when the conversion from one language to another provides an accurate technical translation, but where the translated word(s) are incorrect in the context of the UI and its associated application.

In these and other instances, UI-related errors may not be detected in the standard software quality assurance processes, and may be included in the production version of the application. Where previously a user identifying the issue may be required to report the error back to a support employee or other individual with access to the backend data and metadata defining the UI and its UI elements, the present disclosure provides a system and associated methods for allowing the user identifying the issue to immediately identify and correct the error without needing to notify other users or administrators.

Figure 1:
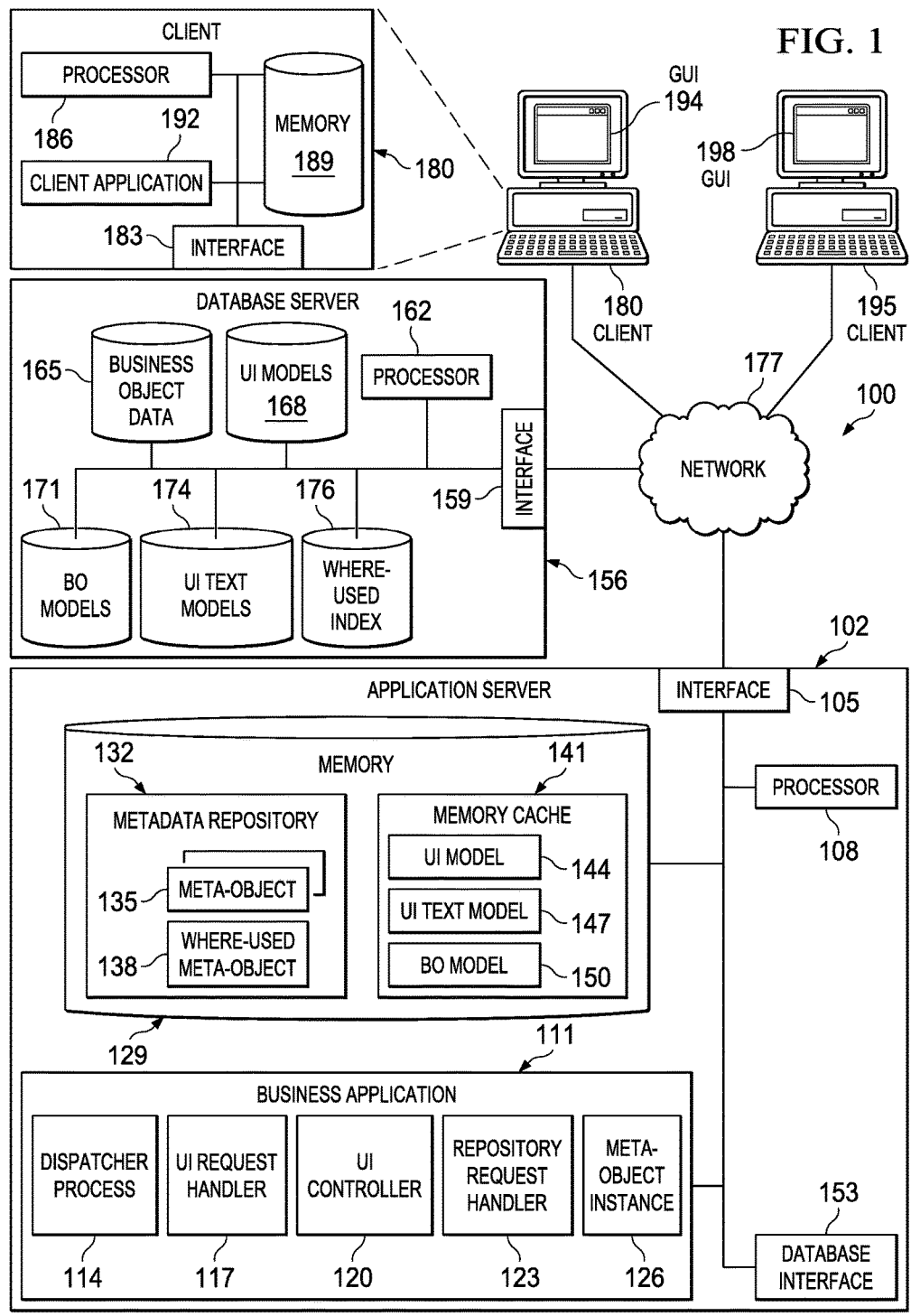
FIG. 1 illustrates an example environment for modifying user interfaces (UIs) presented to a client (or user associated therewith).

Turning to the illustrated example, FIG. 1 illustrates an example environment 100 for presenting UIs to users on different client systems, and, if an error is identified, for allowing the users with appropriate permissions or credentials to modify the UI immediately. The illustrated environment 100 includes, or is communicably coupled with, an application server 102, a database server 156, a first client 180, and a second client 195, at least some of which communicate across a network 177. In general, environment 100 depicts an example configuration of a system capable of allowing a client 180, 195 (or any other local or external user) to identify an error or modification to be made within a UI associated with a particular application, and, using the metadata and backend information defining a particular UI element identified within the UI, immediately modify and/or correct the UI and/or the particular UI element.

In general, the application server 102 can be any server that stores at least one business application 111, where at least a portion of the business application 111 is executed via requests received from and responses sent to users or clients (e.g., client 180, 195) within and/or communicably coupled to the illustrated environment 100 of FIG. 1. In some instances, requests and responses may also be received and/or sent between one or more clients, users, or entities not illustrated in FIG. 1. In general, the application server 102 may be a part of a larger development or production environment, and may in fact be represented as more than one server or system, with each portion performing a portion of the functionality described herein. In some instances, the application server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the application server 102 may store a plurality of business applications 111, while in other instances, the application server 102 may be a dedicated server meant to store and execute only a single business application 111. In some instances, the application server 102 may comprise a web server or be communicably coupled with a web server, where the business application 111 represents, at least in part, one or more web-based applications accessed and executed via network 177 by the clients 180, 195 to perform the programmed tasks or operations of the business application 111. Additionally, the application server 102 may perform the operations associated with modifying one or more UIs or UI elements associated with the business application 111, using information defining a particular UI element, its uses within an application, and access to the metadata associated with each instance of the particular UI element.

At a high level, the application server 102 comprises an electronic computing device operable to receive, transmit, process, store, or manage data and information associated with the environment 100. The application server 102 illustrated in FIG. 1 can be responsible for receiving application requests from one or more client applications 192 or business applications associated with the clients 180, 195 of environment 100, responding to the received requests by processing said requests in the associated business application 111, and sending the appropriate response from the business application 111 back to the requesting client application 192. Alternatively, requests from one or more of the clients 180, 195 may initiate a UI modification process, causing the application server 102 to perform operations to retrieve information on one or more business objects or other meta-objects associated with a particular UI and/or UI element in the business application 111, identify the locations within the business application 111 where the identified UI element is used, and modify the UI element's metadata in a backend system (i.e. database server 156) so that all users viewing the business application 111 will receive the modified (and corrected) UI element during their next call to the business application 111 where the UI element is included or to be presented. Additionally, the business application 111 at the application server 102 can process and respond to local requests from users accessing the application server 102 locally, such as local system administrators. Accordingly, in addition to requests from the clients 180, 195 illustrated in FIG. 1, requests associated with the business application 111 may also be sent from internal users, external or third-party customers, and other automated applications, as well as any other appropriate entities, individuals, systems, or computers. Further, the terms "client application" and "business application" may be used interchangeably, as appropriate, without departing from the scope of this disclosure.

As used in the present disclosure, the term "computer" is intended to encompass any suitable processing device. For example, although FIG. 1 illustrates the application server 102 as a single server, environment 100 can be implemented using two or more servers to perform the operations of the application server 102, as well as computers other than servers, including a server pool. Indeed, the application server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated application server 102 may be adapted to execute any operating system, including Linux, UNIX, Windows, Mac OS, or any other suitable operating system. According to one embodiment, the application server 102 may also include or be communicably coupled with a mail server. In some instances, the application server 102 may be executed in association with and/or part of a set of networked systems in an on-demand or cloud-computing solution.

In the present implementation, the application server 102 includes an interface 105, a processor 108, a memory 129, and a business application 111. The interface 105 is used by the application server 102 for communicating with other systems in a client-server or other distributed environment (including within environment 100) connected to the network 177 (e.g., one or more of clients 180, 195, as well as other systems communicably coupled to the network 177 not illustrated herein). Generally, the interface 105 comprises logic encoded in software and/or hardware in a suitable combination and operable to communicate with the network 177. More specifically, the interface 105 may comprise software supporting one or more communication protocols associated with communications such that the network 177 or interface's hardware is operable to communicate physical signals within and outside the illustrated environment 100.

Although not illustrated in FIG. 1, the application server 102 may also include a local user interface, such as a graphical user interface (GUI). The local GUI can comprise a graphical user interface operable to, for example, allow a local user of the application server 102 to interface with at least a portion of the platform for any suitable purpose, such as managing the application server 102 and/or performing operations associated with the business application 111 (e.g., modifying one or more UIs associated with the business application 111) or other data associated with the application server 102. Generally, the local GUI provides the particular user with an efficient and user-friendly presentation of business data provided by or communicated within the system. The local GUI may comprise a plurality of customizable frames or views having interactive fields, pull-down lists, and buttons operated by the user. For example, the local GUI may provide interactive elements that allow a user to enter, select, create, or modify elements of business process instances or business object instances in the local GUI. More generally, the local GUI may also provide general interactive elements that allow a user to access and utilize various services and functions of the business application 111, including any modifications that may be made to new or modified implementations of business objects and other information associated with the business application 111. The local GUI is often configurable, supports a combination of tables and graphs (bar, line, pie, status dials, etc.), and is able to build real-time portals, where tabs are delineated by key characteristics (e.g., site or micro-site). Therefore, the local GUI contemplates any suitable graphical user interface, such as a combination of a generic web browser, intelligent engine, and command line interface (CLI) that processes information in the platform and efficiently presents the results to the user visually.

As illustrated, the application server 102 is communicably coupled with a network 177 that facilitates wireless or wireline communications between the components of the environment 100 (i.e., between the application server 102 and the database server 156, between the clients 180, 195 and the application server 102, etc.), as well as with any other local or remote computer, such as additional clients, servers, or other devices communicably coupled to network 177 but not illustrated in FIG. 1. In the illustrated environment, the network 177 is depicted as a single network, but may be a continuous or discontinuous network without departing from the scope of this disclosure, so long as at least a portion of the network 177 may facilitate communications between senders and recipients. The network 177 may be all or a portion of an enterprise or secured network, while in another instance, at least a portion of the network 177 may represent a connection to the Internet. In some instances, a portion of the network 177 may be a virtual private network (VPN), such as, for example, the connection between at least one of the clients 180, 195 and the application server 102. Further, all or a portion of the network 177 can comprise either a wireline or wireless link. Example wireless links may include 802.11a/b/g/n, 802.20, WiMax, and/or any other appropriate wireless link. In other words, the network 177 encompasses any internal or external network, networks, sub-network, or combination thereof operable to facilitate communications between various computing components inside and outside the illustrated environment 100. The network 177 may communicate, for example, Internet Protocol (IP) packets, Frame Relay frames, Asynchronous Transfer Mode (ATM) cells, voice, video, data, and other suitable information between network addresses. The network 177 may also include one or more local area networks (LANs), radio access networks (RANs), metropolitan area networks (MANs), wide area networks (WANs), all or a portion of the Internet, and/or any other communication system or systems at one or more locations. The network 177, however, is not a required component of the present disclosure, such that some or all of the functionality may be performed locally at the application server 102.

As illustrated in FIG. 1, the application server 102 includes a processor 108. Although illustrated as a single processor 108 in FIG. 1, two or more processors may be used according to particular needs, desires, or particular embodiments of environment 100. Each processor 108 may be a central processing unit (CPU), a blade, an application specific integrated circuit (ASIC), a field-programmable gate array (FPGA), or another suitable component. Generally, the processor 108 executes instructions and manipulates data to perform the operations of the application server 102 and, specifically, the business application 111 included on or within the application server 102. Specifically, the application server's processor 108 executes the functionality required to receive and respond to requests from the clients 180, 195, as well as the functionality required to perform the operations of the business application 111, including accessing data from the memory 129 of the application server 102 as well as from the database server 156, where appropriate. The processor 108 can also be used to execute any other modules and components of the application system 102, as needed.

At a high level, the business application 111 is any application, program, module, process, or other software that may execute, change, delete, generate, or otherwise manage information according to the present disclosure, particularly in response to and in connection with one or more requests received from the illustrated clients 180, 195 and one or more client applications 192. In certain cases, only one business application 111 may be located within or associated with the application server 102. In others, a plurality of related and/or unrelated business applications 111 may be stored at the application server 102, or located across a plurality of other systems and/or servers comprising the application server 102, as well. In certain cases, environment 100 may implement a composite business application. For example, portions of the composite application may be implemented as Enterprise Java Beans (EJBs) or design-time components, and may have the ability to generate run-time implementations into different platforms, such as J2EE (Java 2 Platform, Enterprise Edition), ABAP (Advanced Business Application Programming) objects, or Microsoft's .NET, among others. Additionally, the business application 111 may represent web-based applications accessed and executed by remote clients 180, 195 or client applications 192 via the network 177 (e.g., through the Internet). Further, while illustrated as internal to the application server 102, one or more processes associated with a particular business application 111 may be stored, referenced, or executed remotely. For example, a portion of a particular business application 111 may be a web service associated with the application that is remotely called, while another portion of the business application 111 may be an interface object or agent bundled for processing at a remote client 180 (such as client application 192). Moreover, any or all of the business applications 111 may be a child, sub-module, or portion of another software module or enterprise application (not illustrated) without departing from the scope of this disclosure. Still further, portions of the business application 111 may be executed by a user or operator working directly, or locally, at the application server 102, as well as remotely at clients 180, 195.

The operations of the business application 111 may be associated with one or more UIs used to present and receive information from users interacting with the business application 111. In the illustrated example, users can access the business application 111 at clients 180, 195, and the business application 111 can execute to generate one or more defined UIs for presenting or receiving information responsive or related to the requests and information provided or requested by the users. As illustrated, the business application 111 includes a dispatcher 114, a UI request handler 117, a UI controller 120, a repository request handler 123, and a meta-object instance 126. In some instances, some or all of the these additional modules and components may be combined into a single module operable to perform the operations associated with each of the described components, as well as various combinations of modules. In other instances, one or more of the modules/components may not be included in the system, including some or all of the functionality performed by those removed modules/components. The set of components illustrated in FIG. 1 are meant to represent a single implementation, and can be modified for any number of alternative or additional instances. Additionally, some or all of the components may be used in, associated with, embedded in, or modules of the business application 111, as well as an enterprise software system (not illustrated). In some implementations, one or more of the components, including the business application 111, can be executed by a different processor or system external to the application server 102, such as by a server or other system communicably coupled to the application server 102 through network 177. For example, the business application 111 may be provided as an on-demand service via a cloud computing network or platform, such as a web service accessible via network 177, or as a service provided on a dedicated server or computer other than the application server 102.

The dispatcher 114 receives and processes requests sent to the business application 111 (or to the application server 102 as a whole), and determines which entities and instances should receive and/or handle a particular request. The dispatcher 114 may be a process associated with the business application 111 to determine whether to instantiate a new instance of a business application process or to provide information to an existing business application process instance. Additionally, the dispatcher 114 may parse requests to determine which business application processes are to be executed in response to a request. For outgoing data and information, the dispatcher 114 can route information to an appropriate entity, such as one of the clients 180, 195 associated with an initial request or submission.

The UI request handler 117 receives requests forwarded by the dispatcher 114 and, along with the UI controller 120, determines the appropriate actions to take in association with the business application 111. Specifically, the UI request handler 117 may receive and interpret a request for a particular UI or portion of the business application 111 (and may then determine the appropriate UI to present), with the UI controller 120 assisting in presenting and managing the operations performed by the selected UI. Specifically, the UI controller 120 can interpret input from the requestor and initiate a response by calling one or more operations associated with the objects and UI elements presented in the present UI, such as operations associated with at least one object (e.g., a meta-object, a business object, etc.) associated with the presented UI. For example, the UI controller 120 may direct or identify one or more meta-object instances 126 associated with the UI to perform the operations initiated or associated with the received request.

In some instances, in handling the request, the UI controller 120 can convert the request into an understandable format for one or more meta-objects and/or models associated with the UI to perform the processing of the associated information, such as items stored within the memory cache 141 of the application server 102 (i.e., a UI model 144, a UI text model 147, or a business object (BO) model 150, among others), as well as items stored within the database server 156, including a set of business object data 165, a set of UI models 168, a set of BO models 171, or a set of UI text models 174. The UI controller 120 can notify the appropriate model of the meta-object of the request, possibly causing a change in the model or meta-object's state. The UI controller 120 (or an associated view controller) can be used to determine the changed state of the model or meta-object and generate an appropriate responsive UI. The data for populating the responsive UI may be retrieved from information defining the modified state of the model or meta-object.

A repository request handler 123 can handle and interpret requests received through the UI (i.e., from a particular client 180, 195 or from a user) to determine if additional information from one or more repositories, including a local or remote metadata repository 132, is needed. If the request requires additional information or metadata associated with a particular meta-object or model, the repository request handler 123 can identify the UI element associated with the request, determine the appropriate repository to access, and retrieve and return a set of information associated with that UI element and its associated meta-object. The repository request handler 123 (in some instances, with the assistance of the UI controller 120) can generate a new UI associated with the identified UI element for presenting the appropriate information requested. In some instances, this may include information from the UI model 144, the UI text model 147, or the BO model 150 illustrated within memory cache 141.

The illustrated meta-object instance 126 may include any number of meta-objects used in conjunction with a particular business application 111 and its business application processes. In some instances, two or more meta-object instances 126 may be used in the application server 102 to operate within a single UI associated with the business application 111, as well as two or more UIs associated with different processes operating in the business application 111. In general, each meta-object instance 126 is an instance of a particular meta-object 135 located within the metadata repository 132. The metadata repository 132 may store a set of meta-objects 135, as well as a Where-Used meta-object 138. The set of meta-objects 135 can include various objects used or associated with the business application 111, including business objects representing business processes and metadata that can be used to perform actions associated with the business application 111, as well as particular UIs and other objects.

The metadata repository 132 may also include a Where-Used Meta-Object 138 providing a description of where particular meta-objects are used within the business application 111. In some instances, the Where-Used Meta-Object 138 may be a cached or instantiated version of a Where-Used Index 176 included in the database server 156. The Where-Used Meta-Object 138 and the Where-Used index 176 can store or reference information defining where particular meta-objects (such as those in the set of meta-objects 135) are used, including their usage in particular UIs and models. Using the Where-Used Meta-Object 138 (or the Where-Used Index 176), the locations of where a particular meta-object is associated can be identified, the dependencies with one or more other meta-objects can be defined, and the current or previous instantiated versions of particular meta-objects can be determined. In some instances, the users or clients who have recently or are currently using the particular meta-object 135 can be identified. If information associated with the particular meta-object 135 is modified by one user, reference to the Where-Used Meta-Object 138 (or the Where-Used Index 176) can be used to determine one or more users' memory caches to be invalidated, allowing changes to be propagated across users to provide the most up-to-date information for the particular meta-object and its related items. In some instances, the Where-Used Meta-Object 138 (or the Where-Used Index 176) can be used by the business application 111 to identify a path from a particular UI element, such as a label, within the UI down to a particular repository of information associated with the UI element type or its related entity, and further to the exact repository entity or entry associated with the UI element.

As illustrated in FIG. 1, the metadata repository 132 is stored within the memory 129 of the application server 102. Memory 129 can store data and program instructions, including the objects, their consistency status, and other data and information associated with the application server 102, one or more instances of the business application 111, as well as other information relevant to the application server 102 and the processes or operations associated therewith. Memory 129 may include any memory or database module and may take the form of volatile or non-volatile memory including, without limitation, magnetic media, optical media, random access memory (RAM), read-only memory (ROM), removable media, or any other suitable local or remote memory component. Memory 129 may store various objects or data, including classes, frameworks, applications, backup data, business objects, meta-objects, indexes, jobs, web pages, web page templates, database tables, repositories storing business and/or dynamic information, and any other appropriate information including any parameters, variables, algorithms, instructions, rules, constraints, or references thereto associated with the purposes of the application server 102 and its business application 111. While memory 129 is illustrated entirely within the application server 102 in FIG. 1, some or all of the components illustrated in memory 129 may be stored external to the application server 102 and/or to the illustrated environment 100 in some implementations.

Memory 129 also includes a memory cache 141. In some instances, multiple users or clients 180, 195 may access the application server 102. To increase the speed of responses, the application server 102 can use the memory cache 141 to store local, cached versions of data associated with the business application 111 and other processes and operations associated with the application server 102. In the illustrated example of FIG. 1, the memory cache 141 stores cached versions of one or more UI models 144, one or more UI text models 147, and one or more business object models 150. Additional and/or alternative sets of information associated with the application server 102 and the business application 111 can be stored in the memory cache 141, as appropriate. In some instances, the data and items stored in the memory cache 141 may be populated at run-time using information retrieved from the database server 156. That information may then be stored in the memory cache 141 as it is used by the application server 102 to respond to requests received from one or more clients 180, 195 and other users. To retrieve the information from the database server 156, the application server 102 is illustrated as including a database interface 153, which may include an application programming interface (API) and associated methods for accessing, retrieving, and sending information to and from the database server 156 and its associated repositories.

Returning to the items illustrated in the memory cache 141, the set of UI models 144 can define or describe the layout and structure of different UIs, as well as those UIs' particular binding to one or more business object services and/or operations. The set of BO models 150 can describe the underlying business services associated with the system. The set of UI Text models 147 can describe the portions of text included in a particular UI. For example, one UI may be used to create a sales order. The UI model 144 for this purpose may be entitled "Create Sales Order" and may be in a structure providing one or more fields, text boxes, buttons, and other UI elements. Certain UI elements can be bound to or associated with particular business objects, which describe the actions to be performed when information associated with the UI element is received or is to be presented. UI elements within a particular UI model 144 can also be linked to various UI text models 147, where the UI text models 147 can describe the text, labels, and other information to be presented in conjunction with the UI. In one example, a particular UI text model 147 can include a set of UI labels and other information to present in a particular UI for several different languages. For example, a particular UI text model 147 may define labels for various UI elements in English, German, Chinese, and French. The particular text from the UI model 147 used within a UI can be determined based on the preferences of the user, the settings of the business application 111, or other appropriate determining factors.

For each model type used with the business application 111, a corresponding meta-object 135 may exist within the metadata repository 132. The content of the meta-objects 135 may comprise the development entities associated with the business application 111. As described above, each model type can have associations to or with other model types. For example, an element within a BO model having a node structure may have an association to a related UI text. By using the BO node element in the UI, the corresponding UI text can be found by reading and processing the association with the association to the UI text model.

In the illustrated example of FIG. 1, the database server 156 represents a back-end system in which information associated with the application server 102, as well as one or more other servers or systems, is stored. As illustrated, the database server 156 includes a processor 162, an interface 159, a set of business object data 165, a set of UI models 168, a set of UI text models 174, and a set of BO models 171. In the illustrated example, the database server 156 stores the back-end, or persistent, versions of the various models and metadata information used in different application servers 102. The set of business object data 165 stores information associated with particular business objects, including metadata defining the business objects, as well as information associated with specific instances and versions of different business objects. For example, if a business object is instantiated two or more times by different business applications 111, the set of business object data 165 can store information specific to each particular instance. Although only one application server 102 is illustrated in FIG. 1, the database server 156 may be associated with a plurality of application servers 102 and business applications 111, allowing the information stored in the database server 156 to be shared or accessed by multiple applications and processes. Additionally, although only a single database server 156 is illustrated, two or more database servers 156 may be used in the environment 100.

The database server's 156 processor 162 and interface 159 may be similar to or different than the processor 108 and interface 105 of the application server 102. In general, the interface 159 allows the database server 156 to communicate with components communicably coupled to the network 177. In some instances, the database server 156 and the application server 102 may be directly connected to one another, while in other instances, the database server 156 and the application server 102 may be combined into a single server or system. The processor 162 can be any suitable type or number of processors, and can execute requests for data from one of the repositories 165, 168, 171, 174 within the database server 156, as well as to store data in the appropriate repository sent by one or more clients 180, 195, the application server 102, or other entities or components associated with the illustrated environment 100.

The illustrated environment of FIG. 1 also includes one or more clients 180, 195. Each client 180, 195 may be any computing device operable to connect to or communicate with the application server 102 (and/or the database server 156), either directly or via the network 177 using a wireline or wireless connection. Each client 180, 195 includes an interface 183, a processor 186, a memory 189, a client application 192, and a graphical user interface (GUI) 194 (or 198 in client 195). In general, each client 180, 195 comprises an electronic computer device operable to receive, transmit, process, and store any appropriate data associated with the environment 100 of FIG. 1. It will be understood that there may be any number of clients 180, 195 associated with, or external to, environment 100. For example, while illustrated environment 100 includes two clients 180, 195, alternative implementations of environment 100 may include a single client or multiple clients communicably coupled to the application server 102 (and/or the database server 156), or any other number of clients suitable to the purposes of the environment 100. Additionally, there may also be one or more additional clients external to the illustrated portion of environment 100 that are capable of interacting with the environment 100 via the network 177. Further, the term "client" and "user" may be used interchangeably as appropriate without departing from the scope of this disclosure. Moreover, while each client 180, 195 is described in terms of being used by a single user, this disclosure contemplates that many users may use one computer, or that one user may use multiple computers. In some instances, client 180 may represent a general user of the first system 102, while client 195 may represent an administrator or other support entity associated with the application server 102.

The GUI 194, 198 associated with clients 180, 195 comprises a graphical user interface operable to, for example, allow the user of the clients 180, 195 to interface with at least a portion of the platform for any suitable purpose, such as creating, preparing, requesting, modifying, or analyzing data and UIs, as well as viewing and accessing documents and files associated with various business transactions. Generally, the GUI 194, 198 provides the particular user with an efficient and user-friendly presentation of business data provided by or communicated within the system. The GUI 194, 198 may comprise a plurality of customizable frames or views having interactive fields, pull-down lists, and buttons operated by the user. For example, the GUI 194, 198 may provide interactive elements that allow a user to enter or select elements of business process instances and business objects associated with the business application 111 in the GUI 194, 198. Portions of the business application 111 associated with the application server 102 may be presented and accessible to the user through the GUI 194, 198, such as through a web browser or client application 192, for example. More generally, the GUI 194, 198 may also provide general interactive elements that allow a user to access and utilize various services and functions of client application 192. The GUI 194, 198 is often configurable, supports a combination of tables and graphs (bar, line, pie, status dials, etc.), and is able to build real-time portals, where tabs are delineated by key characteristics (e.g. site or micro-site). Therefore, the GUI 194, 198 contemplates any suitable graphical user interface, such as a combination of a generic web browser, intelligent engine, and command line interface (CLI) that processes information in the platform and efficiently presents the results to the user visually. In some instances, the client application 192 may be a remote module, agent, or portion of the business application 111 allowing users to access and modify UIs, data, and other information associated with the application server 102 and its business application 111. In some instances, the client application 192 may be a web-based application, or even a web browser, that can perform tasks other than those associated with the application system 102. In some instances, the client application 192 may be used by a remote administrator to manage portions of the business application 111, the application server 102, or the database server 156.

As used in this disclosure, the clients 180, 195 are intended to encompass personal computers, touch screen terminals, workstations, network computers, kiosks, wireless data ports, smart phones, personal data assistants (PDAs), one or more processors within these or other devices, or any other suitable processing devices. For example, each client 180, 195 may comprise a computer that includes an input device, such as a keypad, touch screen, mouse, or other device that can accept user information, and an output device that conveys information associated with the operation of the application server 102, the business application 111, or the client 180, 195 itself, including digital data, visual information, the client application 192, or the GUI 194, 198. Both the input and output device may include fixed or removable storage media such as a magnetic storage media, CD-ROM, or other suitable media to both receive input from and provide output to users of client 180, 195 through the display, namely, the GUI 194, 198.

While FIG. 1 is described as containing or being associated with a plurality of elements, not all elements illustrated within environment 100 of FIG. 1 may be utilized in each alternative implementation of the present disclosure. For example, although FIG. 1 depicts an application server 102 external to network 177, the application server 102, or a portion of the structure, systems, and functionality associated therewith, may be included within network 177 as part of a cloud computing network solution, for example. In some additional instances, the application server 102 may be a set of servers or other systems that combine to perform the operations associated with the business application 111. Additionally, the database server 156 or portions thereof, as well as one or more modules within the application server 102, may be offered as a cloud-based solution, or distributed across one or more systems, including clients 180, 195. Still further, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2:
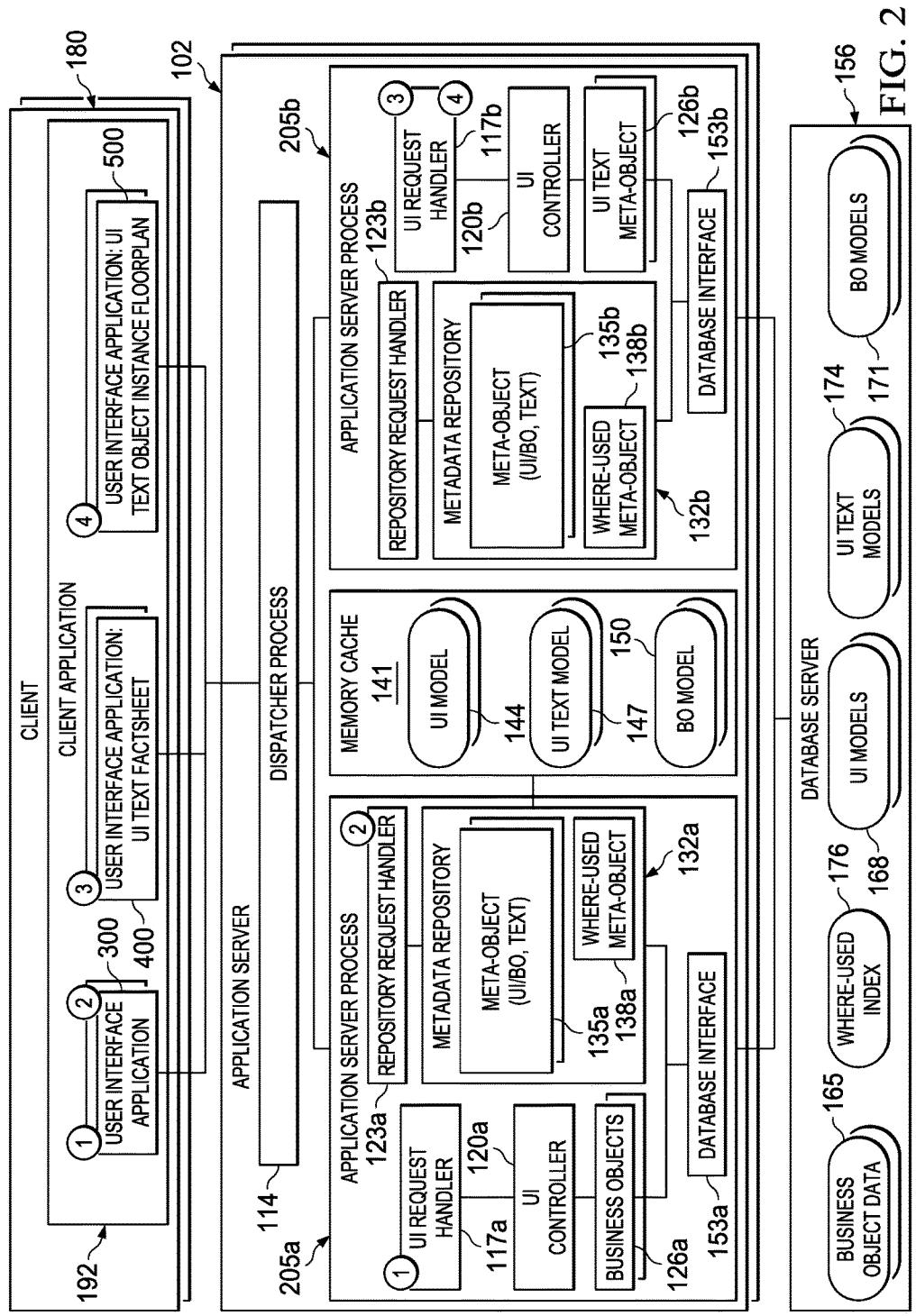
FIG. 2 illustrates an architectural overview of an implementation of an example environment providing tools for one or more users to modify a UI.

FIG. 2 illustrates an architectural overview of an implementation of an example environment 200 providing tools for one or more users to modify UIs in an immediate and straightforward manner. Elements described in FIG. 1 are illustrated in a block diagram in order to provide a description of the elements in action. Alternative or additional elements and components may be used in different implementations, and may not directly correspond to the components described in FIG. 1.

As illustrated in FIG. 2, multiple clients 180 are connected to one or more application servers 102 using a single database server 156 (or database instance). The clients 180 can be executing a particular client application 192, such as a user interface-based client application, such as a web application or other web-based application. The client application 192 may be running in a native execution environment, or using a particular program, such as Microsoft Internet Explorer or another suitable browser using a rendering framework, such as the Silverlight rending framework.

In FIG. 2, a first application server process 205a (possibly associated with the business application 111 of FIG. 1) is executed. The first application server process 205a is associated with a particular business object 126a (or set of business objects). In the current example, the business object 126a allows for the creation of content by associated users, such as a Sales Order business object. A UI text meta-object may be associated with the particular business object 126a, such that particular UI text may be associated with one or more fields within a UI associated with the business object 126a. Further, the application server process 205a can identify a particular UI model 144 (or 168) defining the structure of the UI to be presented, along with connections and bindings to one or more business objects 126a, through a BO model 150. The BO model 150 may then connect one or more portions, attributes, or elements to a UI text model 147. These connections allow the application server process 205a (and the business application 111) to process the models and generate an appropriate user interface associated with the application server process 205a. UI texts, such as the UI label of "Status," can be associated with the status attribute of one or more BOs. In other words, the status attribute of the business object 126a refers to the UI text of "Status." Using the meta-model schema described herein, the same UI text instance (e.g., the UI label "Status") can be used or associated with multiple entities of different business objects, as well as in many different UI models 144. The different usages of a particular UI text instance (as well as business object or UI) can be stored and persisted within the central Where-Used Index 176 of the database server 156, which can be accessible by one of the application server processes 205 or the business application 111, as well as available tools or other applications, through the Where-Used meta-object 138 (illustrated as 138a and 138b in the different application server processes 205a and 205b).

As illustrated at the circle labeled "1", the client application 192 is executing a specific instance of a user interface application 300, using the UI request handler 117a, the UI controller 120a, and one or more business objects 126a associated with the user interface application 300. The specific meta-model content (i.e., meta-object 135a) for the UI application 300 is stored in the metadata repository 132a (or 132b) associated with the application server process 205a performing the operations and processes associated with the UI application 300. In some instances, the application server process 205a may store and access information on and instances of the business objects and meta-models in a local storage location, such as the memory cache 141, or alternatively, by accessing the appropriate data, information, and models at the database server 156, using the database interface 153 (illustrated as database interface 153a in application server process 205a and 153b in application server process 205b).

Figure 3A:
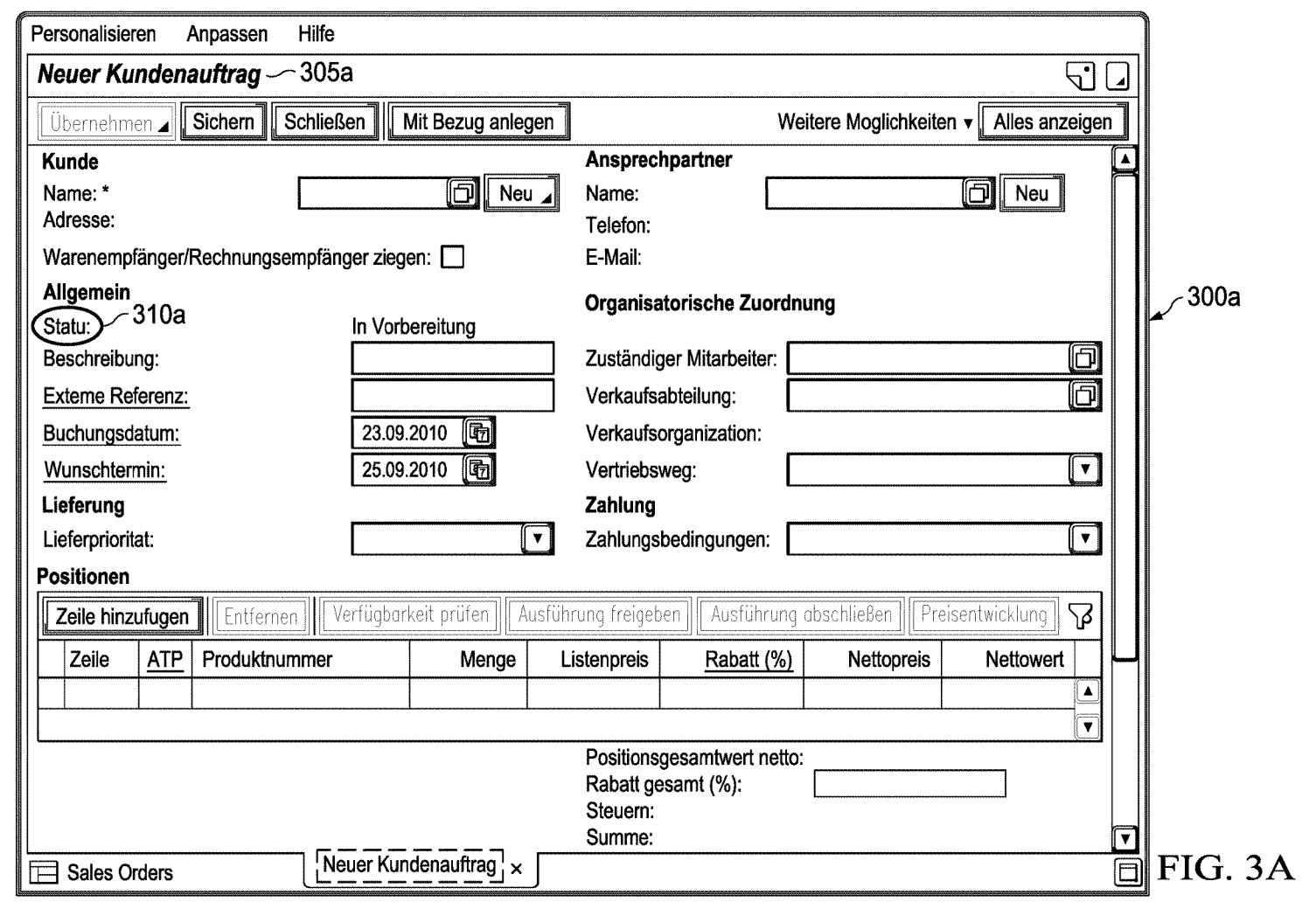
Figure 3B:
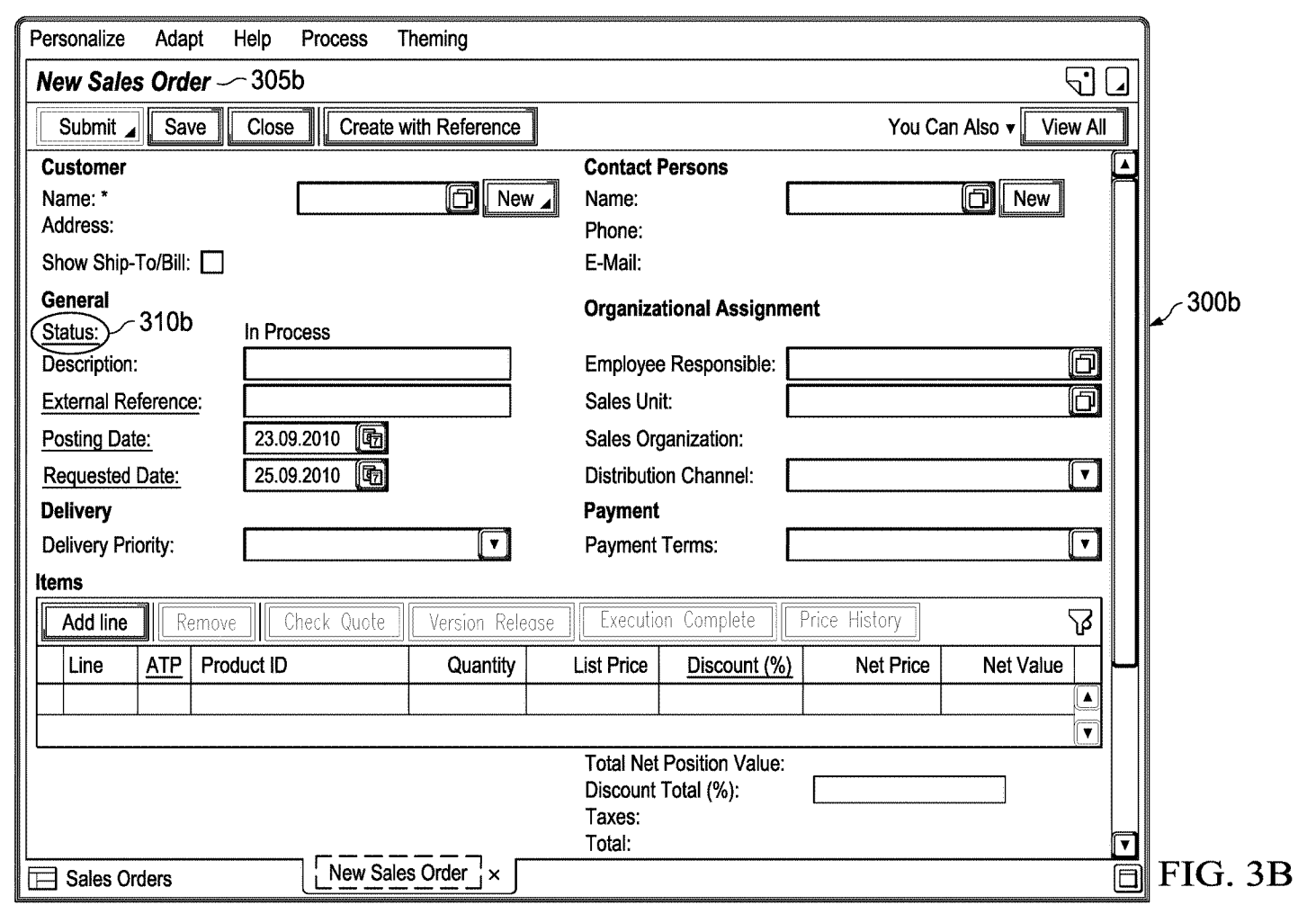

FIG. 3A illustrates an example of a particular UI application 300 generated by the application server process 205a. As illustrated, the UI application 300 is provided in German and referenced as 300a. For purposes of description, the UI application 300a in FIG. 3A will be referred to the UI application 300. For business applications and processes running in an enterprise environment, or any environment where users speaking different languages are common, UI text models 147 may provide language-specific sets of labels for appropriate users. As illustrated in FIG. 3B, an English version of the UI application 300b can also be generated, the two UIs generated from the same UI model 144, associated with the same BO model 150 and business objects, but using the English version or instance of the associated UI text model 147. As illustrated, the UI text label 310b is correct in the English version of the generated UI application 300.

The illustrated example of the UI application 300 is entitled "Neuer Kundenauftrag" 305a in German, or "New Sales Order" 305b in English. The title of the UI application 300 is retrieved from the UI text model 147 associated with the UI model 144 used to generate the visual representation of the UI application 300. The language-specific version of the UI text model 147 can determine the appropriate UI text information to include within the UI application 300. As previously described, portions of the UI application 300 can be associated with specific business objects. As the case in FIG. 3A, the Sales Order business object is associated with the UI application 300, allowing users to create a new instance of the Sales Order business object. As such, various elements, attributes, and information associated with the Sales Order business object are included in the UI application 300. Turning to FIG. 3A, the attribute "Status" is included under the set of entries entitled "Allgemein" (or "General" in English). However, as illustrated in FIG. 3A, the UI text label 310a reads as "Statu," as opposed to the correct German term of "Status." The error may have been generated due to a typographical error, a translation error, or any number of other types of errors that may occur.

Returning to FIG. 2, the UI application 300 may be associated with (or the application server process 205a may recognize and process) one or more triggering user operations or actions. In some instances, specific user-supplied button combinations may cause the UI application 300 to enter a UI text correction mode, generate a new window associated with the UI application 300, or provide additional information on the UI text model 147 associated with the identified error or item to be modified. The triggering operation may include a keyboard combination (such as a shortcut key combination), a mouse gesture, a keyboard-mouse combination (such as a mouse-over action plus a keyboard entry), an option selected after a right-button mouse-click on the UI text, or any other suitable triggering actions. Additionally, placing the focus of the UI on the element and using a menu action to select the element or label is a possible triggering action. In some instances, a user may cause the UI application 300 to enter an editing mode, then allowing the user to select a particular element or UI text item to be modified. As illustrated in FIG. 2 (and by circle "3"), the triggering operation or action can be entered at the UI application 300 within the client application 192, in turn causing the repository request handler 123a to retrieve a set of information associated with the identified UI element or text label. Specifically, the repository request handler 123a can determine the UI text or element from the UI selected or associated with the trigger, and request a corresponding UI text key. The UI text key can be identified through the use of the Where-Used meta-object 138a to determine the UI text element selected and its unique key to determine the UIs and other locations in which the UI text element is located and/or used. The repository request handler 123*a* can return, for instance, an object-based navigation (OBN) key for the UI text factsheet 400 associated with the identified or selected UI element (the key also represented as the title 402 of the UI text factsheet 400).

As illustrated by the circles labeled "3," an instance of the UI text factsheet 400 can be generated by a second application sever process 205*b* once the OBN key for the UI text factsheet 400 associated with the UI element is returned. The UI application's UI text factsheet 400 may be a new window within the client application 192, or the UI text factsheet 400 may take the place of the previous window for the UI application 300. FIG. 4 illustrates an example of the generated UI factsheet 400 associated with the "Statu" UI text 310*a* identified in FIG. 3A. The OBN key becomes the label of the UI text factsheet 400 presented, where the OBN key for the "Statu" UI text label is "GEN_BYD_009826." As illustrated, a set of information defining the UI text element is presented, including information regarding the creation of the UI text element, the technical details 415 of the UI text element (such as a package, category, original language, and the current language in which the UI text element is presented). Additionally, a table 425 illustrating the available languages in which the UI text element is associated is presented, as well as the text that is presented to users in each instance. When the UI text factsheet 400 is generated, the UI text meta-object acts similar to a regular business object, with the UI text meta-object 126*b* being used by the UI controller 120*b* in the second application server process 205*b* to present the UI text factsheet 400. As illustrated, the UI text factsheet 400 may include an "edit" button 405, allowing a user to select the edit button 405 to modify information within the UI text factsheet 400, and therefore, for the UI text element in the entire system.

FIG. 5 illustrates an example of a UI text object instance floorplan 500 associated with the particular UI text identified by the OBN key and illustrated in the UI text factsheet 400 of FIG. 4. The UI text object instance floorplan 500 represents a pattern-based standard template that may be used to define a particular UI text object or element—in this case, the "Status" UI text element. FIG. 5 illustrates screen 500A, which represents a set of editable general data associated with the UI text factsheet 400, while screen 500B represents a set of editable UI text labels in the languages in which the UI text element is presented or associated. Specifically, field 520 illustrated in 500B provides the specific short text used when the UI text label is included in a particular UI. Four languages are illustrated in FIG. 5: English, Chinese, German, and French, although different examples may include more, fewer, and/or different languages, as well as a single language. The user interacting with the UI text object instance floorplan 500 can correct and/or modify the fields, as appropriate. In the present instance, the modification is illustrated as a modification to the German short text from "Statu" to "Status" (as illustrated by 525). Once the change is completed, the user can save the modifications.

Returning to FIG. 2, once the modifications are made and saved within the UI text object instance floorplan 500, the UI request handler 117*b* and UI controller 120*b* can modify the UI text meta-object 126*b*, as well as the UI text model 147 (and 174) associated with the UI text meta-object 126*b*. In some instances, the modification can be stored in the database server's 156 version of the associated UI text model 174 (by sending the change through the database interface 153*b*), so that other users and instances of the application server process 205 can use the updated information to reflect the modifications in all other instances of the UI text element within other UI applications 300. In some instances, the change may require the memory cache 141 (or the cached UI text model(s) 147) to be invalidated, so that currently running processes retrieve the updated information from the database server 156, as opposed to using the outdated information located in the memory cache 141. In the illustrated example, users working with the German version of the UI text element "Status" can now see the correct label associated with the UI text element. In doing so, the architecture allows for immediate and straight-forward modifications to be made to UI text elements and information.

Figure 6:
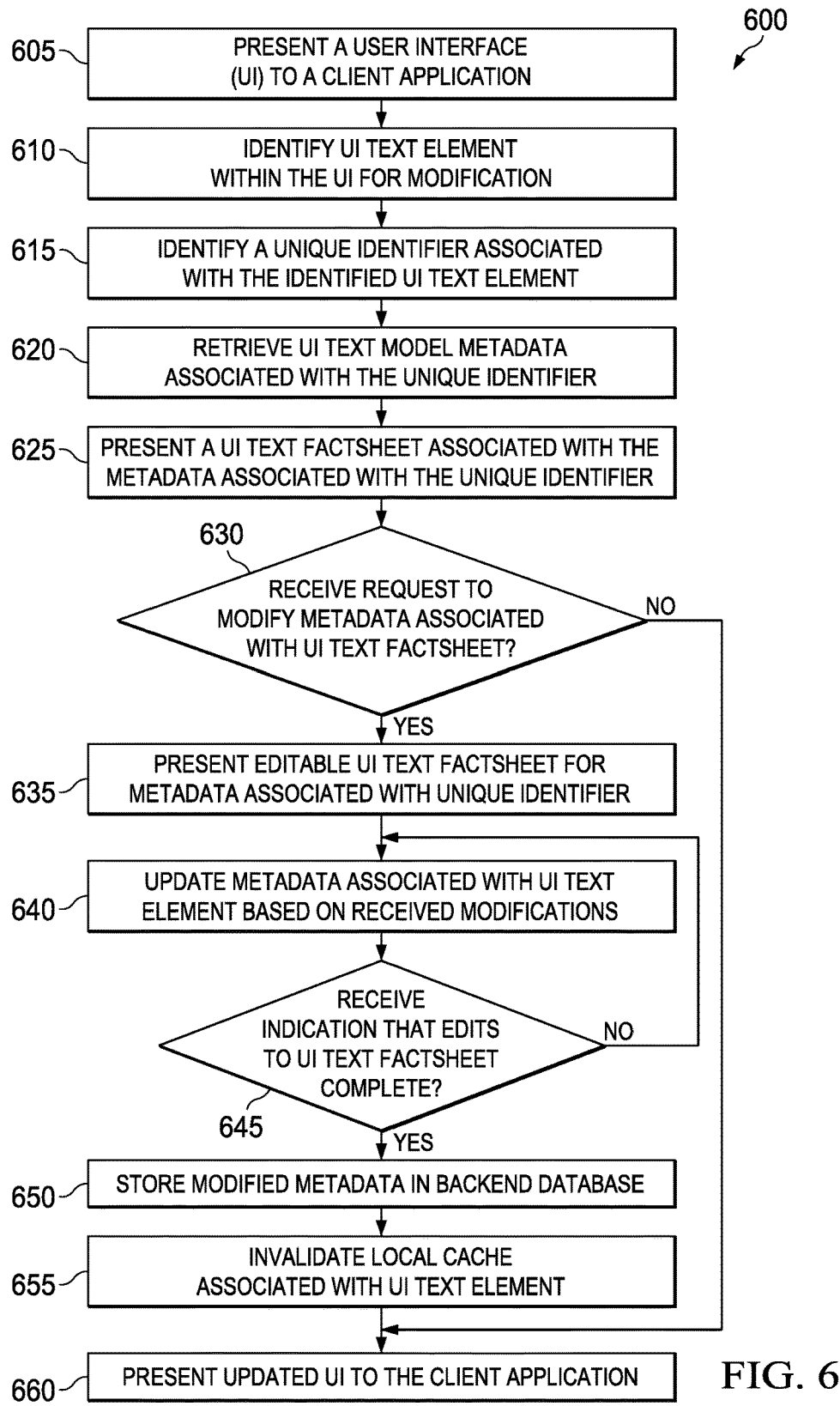
FIG. 6 is a flowchart of an example method for identifying and modifying a particular UI element in an environment presenting one or more UIs to users or clients, such as the example environment of FIG. 1.

FIG. 6 is flowchart of an example method 600 for identifying and modifying a particular UI text element in an environment presenting one or more UIs to users or clients. For clarity of presentation, the description that follows generally describes method 600 in the context of environment 100 illustrated in FIG. 1 and the architecture 200 illustrated in FIG. 2. However, it will be understood that method 600 may be performed, for example, by any other suitable system, environment, or combination of systems and environments, as appropriate.

At 605, a UI is presented to a client application, where the UI includes one or more fields associated with at least one business object, and can be defined by a particular UI model. The elements of the UI model can be bound to the at least one business object through connections to the at least one business object's business object (BO) model. The BO model and the UI model can further be connected to a UI text model defining the UI text to be associated with the various UI elements included within the UI model (and associated with particular portions of and information related to the at least one business object) and the presented UI. The client application can be a client-side portion of an overall business application, a web browser, a web-based application, or an application executed locally at an application server.

At 610, a particular UI text element within the UI is identified for current modification. In some instances, the identification of a particular UI text element can be performed by processing received user input, such as a predefined keyboard shortcut, mouse gesture, or menu selection, among others The user input can reflect a triggering action or event that identifies the particular UI text element as a candidate for modification.

At 615, a unique identifier associated with the identified UI text element is identified or determined. Because the presented UI is based on a UI model associated with at least one BO model and at least one UI text model, the particular UI text element identified can be located based on its position within the presented UI as well as its relation to a particular UI element, such as a text field or other element. The unique identifier associated with the identified UI text element can be used to identify one UI text element used in multiple locations and instances within a particular business or enterprise application. In some instances, a where-used index can be used to document and locate the various places, UIs, and business objects to which a particular UI text element is used and/or associated. By modifying the information associated with the unique identifier, the information associated with each instance of the UI text element can be modified in one step, as opposed to requiring modifications to each instance of the UI text element within the associated application.

At 620, a set of metadata defining the UI text model associated with the uniquely identified UI text element is retrieved. In some instances, the metadata associated with the uniquely identified UI text element can be retrieved from a local memory cache storing a runtime instance of the UI text model. In other instances, the metadata can be retrieved from a database server or instance in which a persistent copy of the metadata is stored. In some of those instances, the metadata can be stored within a memory cache until any changes associated with the metadata are finalized and/or accepted, in order to avoid causing data access issues with other application instances attempting to retrieve the metadata.

At 625, a UI text factsheet for displaying the metadata associated with the uniquely identified UI text element can be generated and presented (i.e., via the client application). In some instances, the UI text factsheet can contain information on the uniquely identified UI text element, including the UI text element's status, the labels and information presented when the UI text element is provided in a UI, the location of the UI text element object, as well as the labels of the UI text element in one or more languages, such as in a multi-language system.

At 630, a determination is made as to whether a request to modify a portion of the metadata for the uniquely identified UI text factsheet (and thus the associated UI text element) is received. If no request to modify the metadata is received, method 600 skips to 660, where the UI is presented again. In some instances, a window presenting the UI text factsheet may be closed with the original UI again presented to the client application (as in 605). Alternatively, the original UI may be regenerated and presented to the client application. If, however, a request to modify the metadata is received, method 600 continues at 635. The request to modify the metadata associated with the UI text element may be received through the user at the client application selecting an "edit" button or otherwise providing an indication that edits to the UI text factsheet are to be made.

At 635, an editable version of the UI text factsheet for the metadata associated with the uniquely identifiable UI text element is presented. In some instances, the initial UI text factsheet presented at 625 may be editable as originally presented. The editable UI text factsheet may allow users to modify, change, or add to the metadata describing the particular UI text element. In some instances, the editable version of the UI text factsheet may be a UI text object instance floorplan, or a predefined, editable user interface template. Updates to the metadata received through user submissions via the client application are received and can be reflected in the metadata describing and associated with the UI text element and its UI text factsheet at 640.

At 645, a determination is made as to whether an indication that the edits to the UI text factsheet and related metadata are complete is received. If no indication is received, method 600 returns to 640 as updates to the metadata are received. If, however, an indication that the edits are complete is received, method 600 continues at 650. The indication that the edits are complete may include, for example, the activation of a "Save" button within the editable UI text factsheet, the closing of a window containing the editable UI text factsheet, or any other suitable indication received from the client application.

At 650, the modified metadata is persisted in the backend, persistent database. In some instances, this may include modifying a local memory cache storing a set of information defining the metadata associated with the UI text element and its factsheet. The persistent database may be separate from the runtime environment performing the operations associated with the presentation and modification of the UI. At 655, the local memory cache associated with the modified UI text element can be invalidated, causing the updated information to be retrieved by other users and client applications when accessing a UI including the modified UI text element. In some instances, the memory caches for multiple application servers, including those other than where the UI text element was modified, may be invalidated as well to ensure that the newest version of the modified UI text element is used. At 660, the updated UI can be presented to the client application reflecting the modifications made to the UI text element within the UI. In some implementations, one or more other currently executing instances of the UI may be refreshed to provide the most up-to-date version of the UI.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for modifying user interfaces (UIs), the method comprising the following operations:

identifying an instance of a UI text element within a UI associated with a software application for modification, wherein the UI is displayed to at least one user;

retrieving a first set of metadata associated with the identified instance of the UI text element, where each instance in a plurality of instances of the UI text element is associated with the retrieved first set of metadata based on each instance's instantiation from a single UI text model common to each of the plurality of instances, each of the plurality of instances of the UI text element used in different locations, and wherein at least a portion of the retrieved first set of metadata defines the text presented in the identified instance of the UI text element and each of the others of the plurality of instances of the UI text element, where the retrieved first set of metadata associated with each of the plurality of instances of the UI text element is stored in the single UI text model;

receiving at least one modification to the retrieved first set of metadata associated with the identified instance of the UI text element, the at least one modification representing a modification to the defined text presented in the identified instance of the UI text element; and persisting the modified first set of metadata associated with the identified instance by associating the modified first set of metadata with the single UI text model, wherein the text presented in each of the plurality of instances of the UI text element is updated based on the modified first set of metadata associated with the single UI text model common to each of the plurality of instances, wherein persisting includes updating the single UI text model with the modified first set of metadata.

2. The method of claim 1, wherein persisting includes invalidating at least one local memory cache storing a runtime version of the first set of metadata associated with the identified instance of the UI text element after persisting the modified first set of metadata associated with the UI text element.

3. The method of claim 1, where retrieving the set of metadata associated with the instance of the UI text element includes:
   determining a unique identifier associated with identified instance of the identified UI text element; and
   retrieving the first set of metadata associated with the instance of the UI text element based on the determined unique identifier.

4. The method of claim 3, where the determined unique identifier associated with the identified instance of the UI text element corresponds to each instance of the identified instance of the UI text element, and wherein the at least one modification to the retrieved first set of metadata modifies the defined text presented in each instance of identified UI text element.

5. The method of claim 1, where persisting the modified first set of metadata associated with the UI text element includes storing the modified set of metadata in a backend database.

6. The method of claim 1, where receiving at least one modification to the first set of metadata associated with the identified instance of the UI text element includes:
   generating an editable UI text factsheet representing at least a portion of the retrieved first set of metadata;
   receiving at least one modification to the editable UI text factsheet; and
   updating the first set of metadata associated with the UI text element based on the at least one received modification to the editable UI text factsheet.

7. The method of claim 1, wherein each new instance of the UI associated with the identified instance of the UI text element after persisting the modified first set of metadata reflects the modified first set of metadata associated with the UI text element based on the modified first set of metadata persistence in the updated single UI text model.

8. The method of claim 1, wherein identifying the instance of the UI text element within the UI includes receiving an indication of a triggering event performed by the at least one user.

9. The method of claim 8, wherein the triggering event comprises a received indication of an identification of a translation error or typographical error in the UI.

10. The method of claim 8, wherein the indication of the triggering event performed by the at least one user includes identifying a keyboard shortcut performed by the at least one user while focus of the UI is on the instance of the UI text element.

11. A computer program product encoded on a non-transitory, tangible storage medium, the product comprising computer readable instructions for causing one or more processors to perform operations comprising:
   identifying an instance of a UI text element within a UI associated with a software application for modification, wherein the UI is displayed to at least one user;
   retrieving a first set of metadata associated with the identified instance of the UI text element, where each instance in a plurality of instances of the UI text element is associated with the retrieved first set of metadata based on each instance's instantiation from a single UI text model common to each of the plurality of instances, each of the plurality of instances of the UI text element used in different locations, and wherein at least a portion of the retrieved first set of metadata defines the text presented in the identified instance of the UI text element and each of the others of the plurality of instances of the UI text element, where the retrieved first set of metadata associated with each of the plurality of instances of the UI text element is stored in the single UI text model;
   receiving at least one modification to the retrieved first set of metadata associated with the identified instance of the UI text element, the at least one modification representing a modification to the defined text presented in the identified instance of the UI text element; and
   persisting the modified first set of metadata associated with the identified instance by associating the modified first set of metadata with the single UI text model, wherein the text presented in each of the plurality of instances of the UI text element is updated based on the modified first set of metadata associated with the single UI text model common to each of the plurality of instances, wherein persisting includes updating the single UI text model with the modified first set of metadata.

12. The computer program product of claim 11, wherein persisting includes invalidating at least one local memory cache storing a runtime version of the first set of metadata associated with the identified instance of the UI text element after persisting the modified first set of metadata associated with the UI element.

13. The computer program product of claim 11, where retrieving the set of metadata associated with the instance of the UI text element includes:
   determining a unique identifier associated with identified instance of the identified UI text element; and
   retrieving the set of metadata associated with the instance of the UI text element based on the determined unique identifier.

14. The computer program product of claim 13, where the determined unique identifier associated with the identified instance of the UI text element corresponds to each instance of the identified instance of the UI text element, and wherein the at least one modification to the retrieved first set of metadata modifies the defined text presented in each instance of identified UI text element.

15. The computer program product of claim 11, where persisting the modified first set of metadata associated with the UI text element includes storing the modified first set of metadata in a backend database.

16. The computer program product of claim 11, where receiving at least one modification to the first set of metadata associated with the identified instance of the UI text element includes:
   generating an editable UI text factsheet representing at least a portion of the retrieved first set of metadata;
   receiving at least one modification to the editable UI text factsheet; and
   updating the first set of metadata associated with the UI text element based on the at least one received modification to the editable UI text factsheet.

17. The computer program product of claim 11, wherein each new instance of the UI associated with the instance of the UI text element after persisting the modified first set of metadata reflects the modified set of first metadata associated with the UI text element based on the modified first set of metadata persistence in the updated single UI text model.

18. The computer program product of claim 11, wherein identifying the instance of the UI text element within the UI includes receiving an indication of a triggering event performed by the at least one user, wherein the triggering event comprises a received indication of an identification of a translation error or typographical error in the UI.

19. A system comprising:
   memory for storing at least one UI text element and at least one UI associated with a business application; and
   at least one processor operable to:
      identify an instance of a UI text element within a particular UI associated with the business application for modification, wherein the UI is displayed to at least one user;
      retrieve a first set of metadata associated with the identified instance of the UI text element, where each instance in a plurality of instances of the UI text element is associated with the retrieved first set of metadata based on each instance's instantiation from a single UI text model common to each of the plurality of instances, each of the plurality of instances of the UI text element used in different locations, and wherein at least a portion of the retrieved first set of metadata defines the text presented in the identified instance of the UI text element and each of the others of the plurality of instances of the UI text element, where the retrieved first set of metadata associated with each of the plurality of instances of the UI text element is stored in the single UI text model;
      receive at least one modification to the retrieved first set of metadata associated with the identified instance of the UI text element, the at least one modification representing a modification to the defined text presented in the identified instance of the UI text element; and
      persist the modified first set of metadata associated with the identified instance by associating the modified first set of metadata with the single UI text model, wherein the text presented in each of the plurality of instances of the UI text element is updated based on the modified first set of metadata associated with the single UI text model common to each of the plurality of instances, wherein persisting includes updating the single UI text model with the modified first set of metadata.

20. The system of claim 19, wherein persisting includes invalidating at least one local memory cache storing a runtime version of the first set of metadata associated with the identified instance of the UI text element after persisting the modified first set of metadata associated with the UI element.

* * * * *